(12) United States Patent
Slattery

(10) Patent No.: US 11,644,050 B2
(45) Date of Patent: May 9, 2023

(54) HYDRAULIC CONTROL VALVE WITH DUPLICATE WORKPORTS AND INTEGRATED ACTUATOR OSCILLATION CONTROL FEATURES

(71) Applicant: Parker-Hannifin Corporation, Cleveland, OH (US)

(72) Inventor: Brian Slattery, Hicksville, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 17/883,868

(22) Filed: Aug. 9, 2022

(65) Prior Publication Data

US 2022/0381366 A1    Dec. 1, 2022

Related U.S. Application Data

(63) Continuation of application No. 17/290,812, filed as application No. PCT/US2019/068525 on Dec. 26, 2019, now Pat. No. 11,448,241.
(Continued)

(51) Int. Cl.
    *F15B 13/08*       (2006.01)
    *F15B 13/04*       (2006.01)
(Continued)

(52) U.S. Cl.
    CPC .......... *F15B 13/0814* (2013.01); *F15B 1/033* (2013.01); *F15B 13/0417* (2013.01);
(Continued)

(58) Field of Classification Search
    CPC ...... F15B 1/021; F15B 1/027; F15B 13/0814; F15B 13/0817
See application file for complete search history.

(56) References Cited

U.S. PATENT DOCUMENTS

| 2,988,891 | A | | 6/1961 | Hemings | |
|---|---|---|---|---|---|
| 5,992,146 | A | * | 11/1999 | Hausman | ............... E02F 9/2292 60/494 |
| 6,167,701 | B1 | * | 1/2001 | Hatcher | .................. F15B 1/033 60/416 |

(Continued)

FOREIGN PATENT DOCUMENTS

| AT | 500 715 A1 | 3/2006 |
|---|---|---|
| EP | 0 962 663 B1 | 4/2004 |

(Continued)

OTHER PUBLICATIONS

International Search Report and Written Opinion prepared by the European Patent Office in International Application No. PCT/US2019/068525 dated Apr. 14, 2020.

*Primary Examiner* — Thomas E Lazo
(74) *Attorney, Agent, or Firm* — McDonnell Boehnen Hulbert & Berghoff LLP

(57) ABSTRACT

An example valve assembly includes a first workport fluidly coupled to a first actuator; a second workport fluidly coupled to the first actuator; a third workport fluidly coupled to a second actuator, wherein the third workport is fluidly coupled to the first workport via a first fluid passage; a fourth workport fluidly coupled to the second actuator, wherein the fourth workport is fluidly coupled to the second workport via a second fluid passage; and a spool axially movable in a bore within the valve assembly, wherein when the spool is shifted axially in a first axial direction, pressurized fluid is provided to the first workport and to the third workport via the first fluid passage, and when the spool is shifted axially in a second axial direction opposite the first axial direction, pressurized fluid is provided to the second workport and to the fourth workport via the second fluid passage.

15 Claims, 10 Drawing Sheets

Related U.S. Application Data

(60) Provisional application No. 62/789,596, filed on Jan. 8, 2019.

(51) Int. Cl.
*F15B 1/033* (2006.01)
*F16K 31/42* (2006.01)

(52) U.S. Cl.
CPC ...... *F15B 13/0817* (2013.01); *F15B 13/0871* (2013.01); *F16K 31/42* (2013.01); *F15B 2211/20546* (2013.01); *F15B 2211/3052* (2013.01); *F15B 2211/7128* (2013.01)

(56) References Cited

U.S. PATENT DOCUMENTS

| | | | | |
|---|---|---|---|---|
| 8,899,034 | B2 * | 12/2014 | Ballweg | F15B 11/162 |
| | | | | 60/424 |
| 9,074,347 | B2 | 7/2015 | Vigholm et al. | |
| 9,897,228 | B2 | 2/2018 | Barber et al. | |
| 10,024,443 | B2 * | 7/2018 | Sensabaugh | F15B 13/021 |
| 10,161,110 | B2 | 12/2018 | Takeuchi | |
| 2003/0155025 | A1 | 8/2003 | Camozzi | |
| 2017/0130739 | A1 | 5/2017 | Zhang et al. | |
| 2017/0335989 | A1 | 11/2017 | Schlegel et al. | |
| 2018/0335057 | A1 * | 11/2018 | Slattery | F15B 13/0814 |

FOREIGN PATENT DOCUMENTS

| | | |
|---|---|---|
| EP | 2 110 563 A2 | 10/2009 |
| JP | H06 280287 A | 10/1994 |
| WO | WO 2015/086908 A1 | 6/2015 |

* cited by examiner

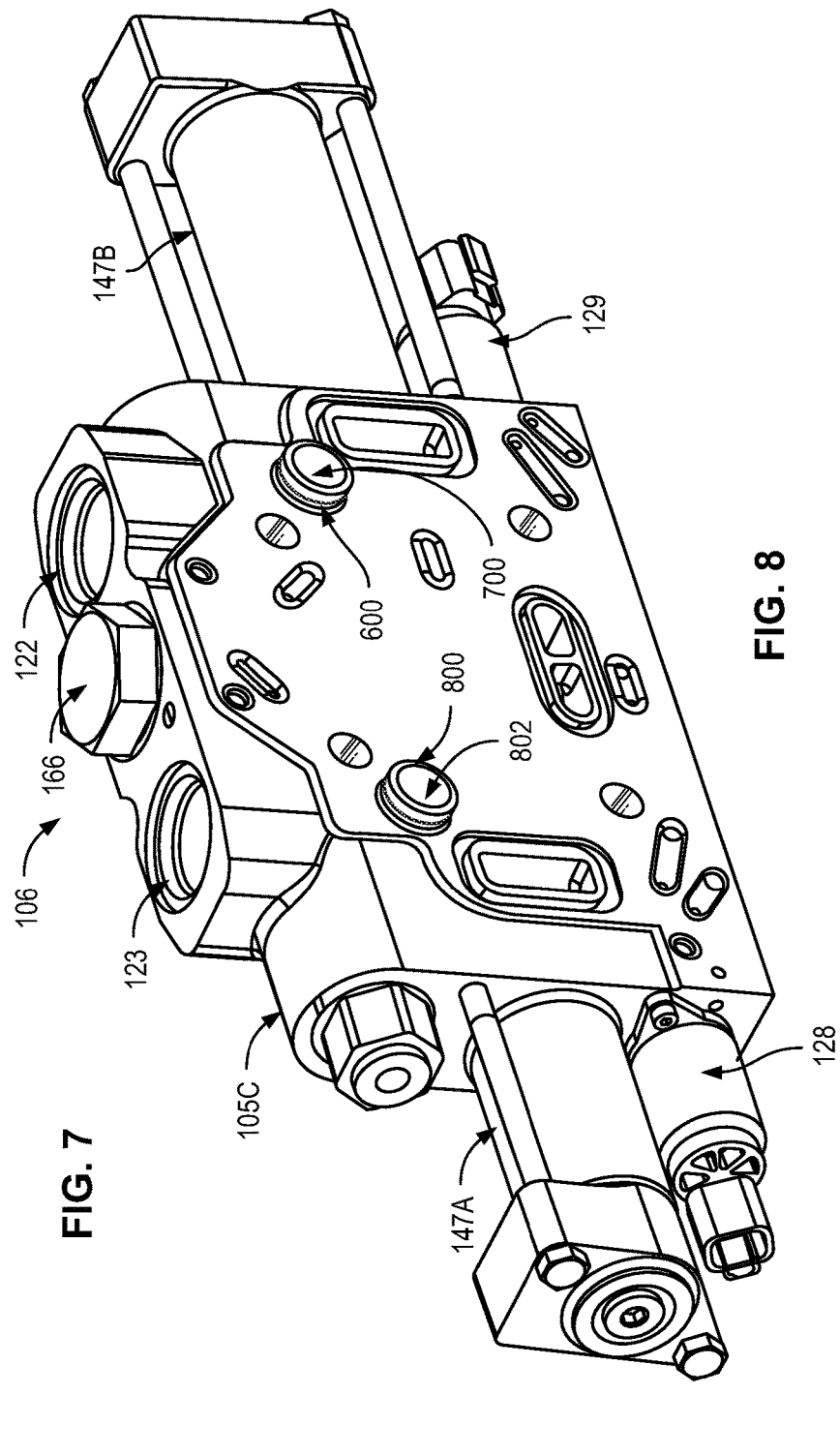

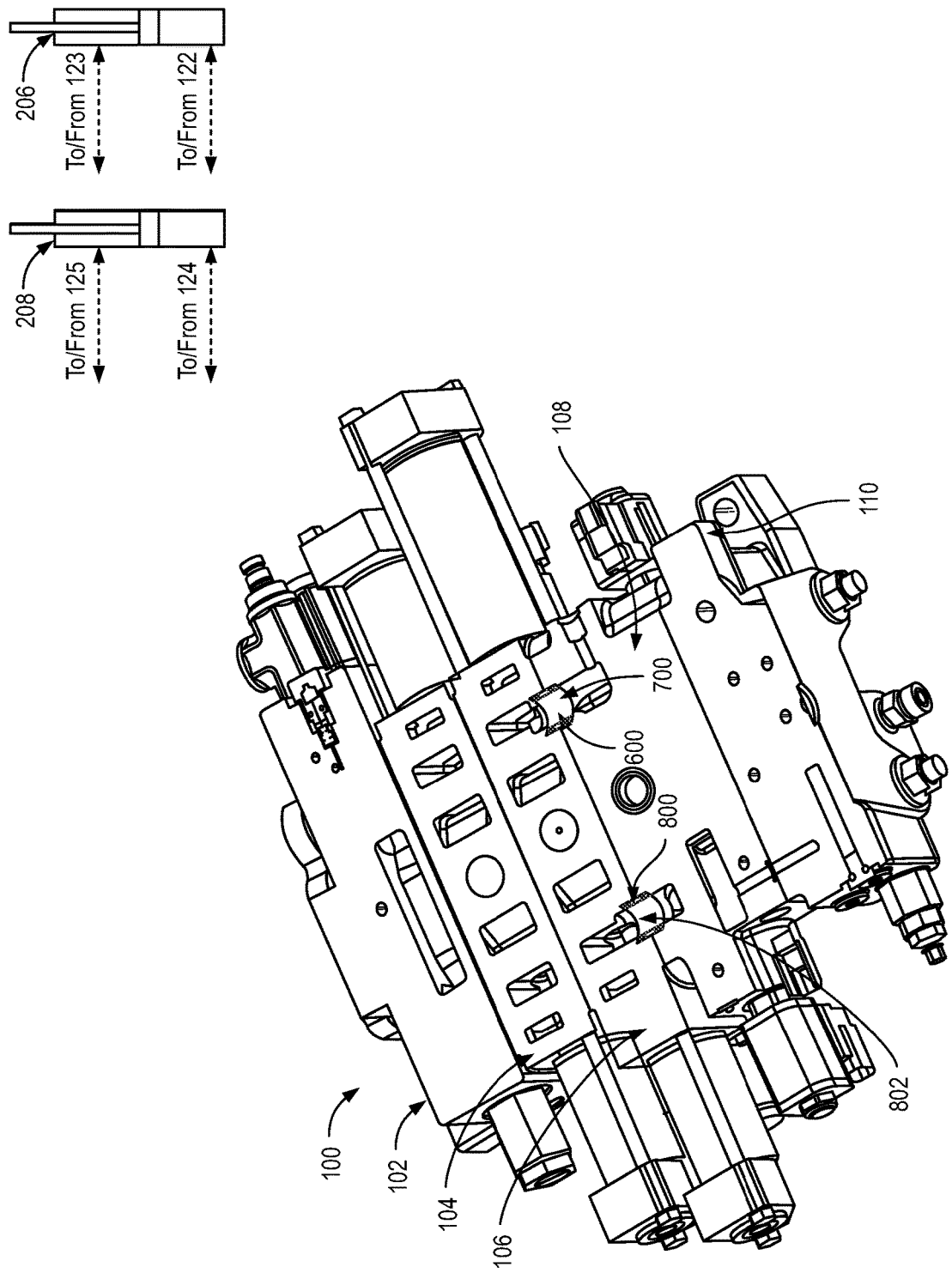

1100

1102 — SHIFTING A SPOOL AXIALLY IN A FIRST AXIAL DIRECTION WITHIN A BORE OF A VALVE ASSEMBLY, WHEREIN THE VALVE ASSEMBLY COMPRISES: (I) A FIRST WORKPORT FLUIDLY COUPLED TO A FIRST CHAMBER OF A FIRST ACTUATOR, (II) A SECOND WORKPORT FLUIDLY COUPLED TO A SECOND CHAMBER OF THE FIRST ACTUATOR, (III) A THIRD WORKPORT FLUIDLY COUPLED TO A THIRD CHAMBER OF A SECOND ACTUATOR, WHEREIN THE THIRD WORKPORT IS FLUIDLY COUPLED TO THE FIRST WORKPORT VIA A FIRST FLUID PASSAGE, (IV) A FOURTH WORKPORT FLUIDLY COUPLED TO A FOURTH CHAMBER OF THE SECOND ACTUATOR, WHEREIN THE FOURTH WORKPORT IS FLUIDLY COUPLED TO THE SECOND WORKPORT VIA A SECOND FLUID PASSAGE, AND WHEREIN SHIFTING THE SPOOL IN THE FIRST AXIAL DIRECTION CAUSES PRESSURIZED FLUID TO BE PROVIDED FROM A SOURCE OF PRESSURIZED FLUID TO THE FIRST WORKPORT AND TO THE THIRD WORKPORT VIA THE FIRST FLUID PASSAGE SO AS TO DRIVE THE FIRST ACTUATOR AND THE SECOND ACTUATOR IN TANDEM IN A FIRST DIRECTION

1104 — SHIFTING THE SPOOL IN A SECOND AXIAL DIRECTION OPPOSITE THE FIRST AXIAL DIRECTION, THEREBY CAUSING PRESSURIZED FLUID TO BE PROVIDED FROM THE SOURCE OF PRESSURIZED FLUID TO THE SECOND WORKPORT AND TO THE FOURTH WORKPORT VIA THE SECOND FLUID PASSAGE SO AS TO DRIVE THE FIRST ACTUATOR AND THE SECOND ACTUATOR IN TANDEM IN A SECOND DIRECTION OPPOSITE THE FIRST DIRECTION

FIG. 11

HYDRAULIC CONTROL VALVE WITH DUPLICATE WORKPORTS AND INTEGRATED ACTUATOR OSCILLATION CONTROL FEATURES

CROSS REFERENCE TO RELATED APPLICATION

The present application a divisional of U.S. patent application Ser. No. 17/290,812, filed on May 3, 2021, which is a U.S. National Phase Application pursuant to 35 U.S.C. § 371 of International Application No. PCT/US2019/068525 filed on Dec. 26, 2019, which claims priority to U.S. Provisional patent application No. 62/789,596, filed on Jan. 8, 2019, the entire contents of all of which are herein incorporated by reference as if fully set forth in this description.

BACKGROUND

A hydraulic machine can have several hydraulic actuators configured to enable the machine to perform primary functions. For example, a wheel loader may have a hydraulic actuator configured to control movement of a bucket, with the bucket being supported by a boom structure (e.g., two arms coupling the bucket to the chassis of the wheel loader). Motion of the boom structure is enabled by one or more hydraulic actuators as well.

A hydraulic system of such a hydraulic machine can include many complex fittings and complex plumbing (e.g., multiple hydraulic lines, hoses, and tubes) between the different components of the hydraulic system. The hydraulic system can therefore be expensive and complicated to assemble, and comprises multiple potential leak points. As such, this configuration can reduce reliability of the machine and increases the likelihood of malfunction and machine downtime.

Therefore, it may be desirable to have configurations and components that reduce plumbing complexity to reduce cost of the machine and enhances its reliability. It is with respect to these and other considerations that the disclosure made herein is presented.

SUMMARY

The present disclosure describes implementations that relate to a hydraulic control valve with duplicate workports and integrated actuator oscillation control features.

In a first example implementation, the present disclosure describes a valve assembly. The valve assembly includes: (i) a monoblock worksection configured to control fluid flow to and from a first actuator and a second actuator configured to be actuated in tandem, wherein the monoblock worksection comprises: (a) a first workport configured to be fluidly coupled to a first chamber of the first actuator, (b) a second workport configured to be fluidly coupled to a second chamber of the first actuator, (c) a third workport configured to be fluidly coupled to a third chamber of the second actuator, wherein the third workport is fluidly coupled to the first workport via a first fluid passage within the monoblock worksection, and (d) a fourth workport configured to be fluidly coupled to a fourth chamber of the second actuator, wherein the fourth workport is fluidly coupled to the second workport via a second fluid passage within the monoblock worksection; and (ii) a spool axially movable in a bore within the monoblock worksection, wherein: (a) when the spool is shifted axially in a first axial direction within the bore, pressurized fluid is provided from a source of pressurized fluid to the first workport and to the third workport via the first fluid passage so as to drive the first actuator and the second actuator in tandem in a first direction, and (b) when the spool is shifted axially in a second axial direction within the bore opposite the first axial direction, pressurized fluid is provided from the source of pressurized fluid to the second workport and to the fourth workport via the second fluid passage so as to drive the first actuator and the second actuator in tandem in a second direction opposite the first direction.

In a second example implementation, the present disclosure describes a valve assembly. The valve assembly includes: (i) a first worksection configured to control fluid flow to and from a first actuator and a second actuator configured to be actuated in tandem, wherein the first worksection comprises: (a) a first workport configured to be fluidly coupled to a first chamber of the first actuator, (b) a second workport configured to be fluidly coupled to a second chamber of the first actuator; (ii) a second worksection mounted to the first worksection, wherein the second worksection comprises: (a) a third workport configured to be fluidly coupled to a third chamber of the second actuator, wherein the third workport is fluidly coupled to the first workport via a first fluid conduit, and (b) a fourth workport configured to be fluidly coupled to a fourth chamber of the second actuator, wherein the fourth workport is fluidly coupled to the second workport via a second fluid conduit; and (iii) a spool axially movable in a bore within the first worksection, wherein: (a) when the spool is shifted axially in a first axial direction within the bore, pressurized fluid is provided from a source of pressurized fluid to the first workport and to the third workport via the first fluid conduit so as to drive the first actuator and the second actuator in tandem in a first direction, and (b) when the spool is shifted axially in a second axial direction within the bore opposite the first axial direction, pressurized fluid is provided from the source of pressurized fluid to the second workport and to the fourth workport via the second fluid conduit so as to drive the first actuator and the second actuator in tandem in a second direction opposite the first direction.

In a third example implementation, the present disclosure describes a hydraulic system. The hydraulic system includes a source of pressurized fluid; a tank; a first actuator having a first chamber and a second chamber; a second actuator having a third chamber and a fourth chamber, and configured to be actuated in tandem with the first actuator; and a valve assembly fluidly coupled to the source of pressurized fluid, the tank, the first actuator, and the second actuator. The valve assembly further includes: (i) a first workport fluidly coupled to the first chamber of the first actuator; (ii) a second workport fluidly coupled to the second chamber of the first actuator; (iii) a third workport fluidly coupled to the third chamber of the second actuator, wherein the third workport is fluidly coupled to the first workport via a first fluid passage; (iv) a fourth workport fluidly coupled to the fourth chamber of the second actuator, wherein the fourth workport is fluidly coupled to the second workport via a second fluid passage; and (v) a spool axially movable in a bore within the valve assembly, wherein: (a) when the spool is shifted axially in a first axial direction within the bore, pressurized fluid is provided from the source of pressurized fluid to the first workport and to the third workport via the first fluid passage so as to drive the first actuator and the second actuator in tandem in a first direction, and (b) when the spool is shifted axially in a second axial direction within the bore opposite the first axial direction, pressurized fluid is provided from the source of pressurized fluid to the second workport and to the fourth workport via the second fluid passage so as to drive the first actuator and the second actuator in tandem in a second direction opposite the first direction.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

FIG. 7 illustrates a perspective view of the tube of FIG. 6, in accordance with an example implementation.

FIG. 8 illustrates a perspective view of a worksection having a first tube and a second tube mounted thereto, in accordance with an example implementation.

FIG. 9 illustrates a perspective cross-sectional view of a valve assembly showing the two tubes of FIG. 8, in accordance with an example implementation.

FIG. 11 is a flowchart of a method for operating a hydraulic system, in accordance with an example implementation.

DETAILED DESCRIPTION

Figure 1:
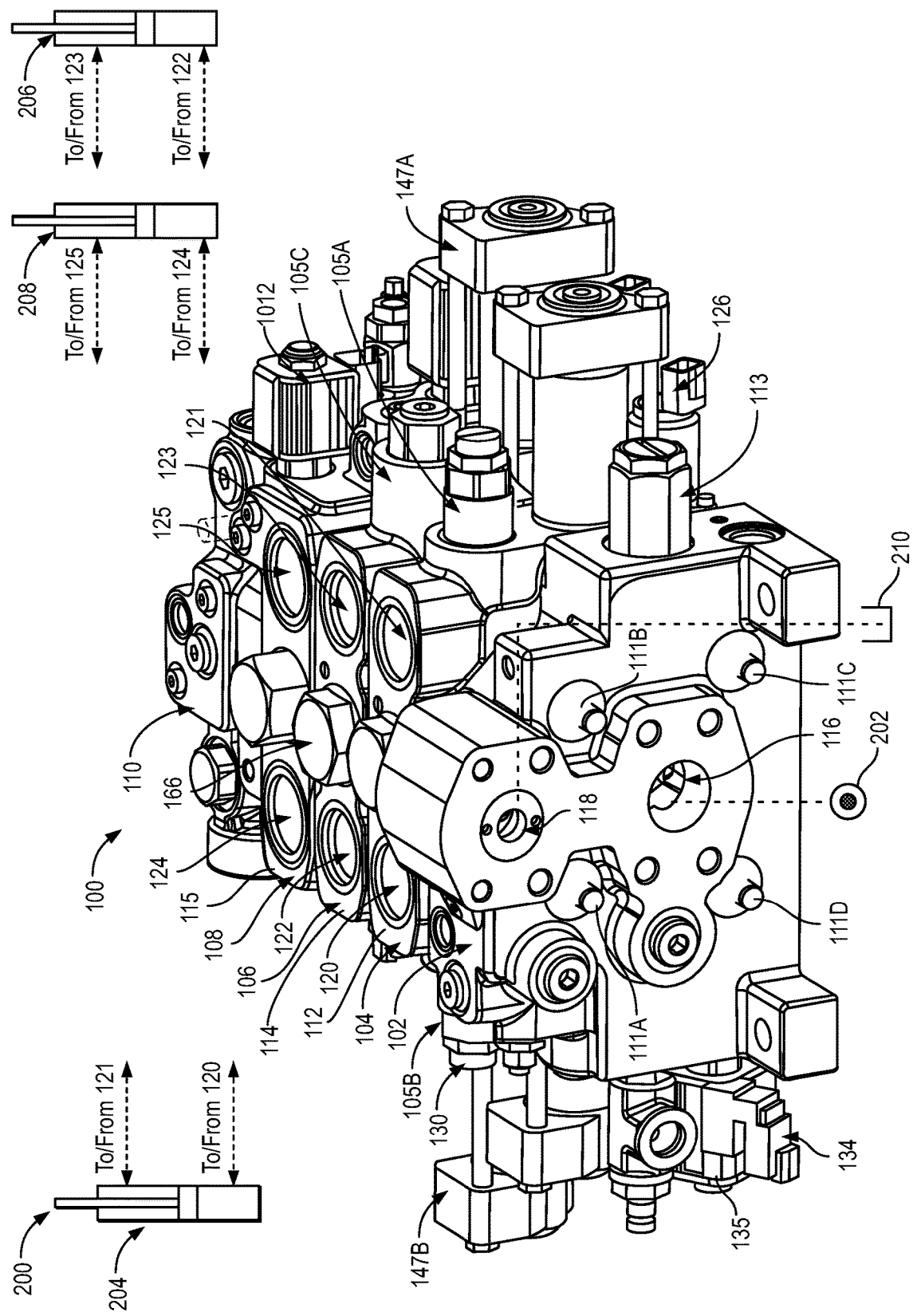
FIG. 1 illustrates a perspective view of a valve assembly of a hydraulic system, in accordance with an example implementation.

Hydraulic machinery (e.g., a wheel loader) includes a hydraulic system configured to control fluid flow to hydraulic actuators. Particularly, the hydraulic system can include a source of fluid, such as a pump, configured to provide fluid flow at a particular pressure level to the hydraulic actuators through a valve to cause the hydraulic actuators to move.

In certain applications, fluid flow in a hydraulic machine can be controlled using sectional control valves. A sectional control valve or valve assembly can include a plurality of separate cast and machined metal valve worksections. Each worksection can include internal fluid passages, external ports, and valve bores.

The valve bores can include a spool bore in which a spool is slidably disposed. Each worksection can be configured to control flow of fluid to and from a hydraulic actuator of the hydraulic machine. For example, in the case of a wheel loader, the valve can have one worksection to control fluid flow to and from a bucket actuator and another worksection to control fluid flow to and from boom actuators.

A large-bucket wheel loader machine can have a pair of hydraulic actuators for the boom. In this case, fluid provided from the valve to the boom actuators is split evenly between the two boom actuators to be able to drive the boom actuators in tandem. Further, some wheel loaders include boom actuator oscillation control features to keep the machine stable while driving across uneven ground with a heavy load in the bucket. The boom actuator oscillation control features involve using a separate valve that is in fluid communication with the main valve that provides fluid to the boom actuator. The separate valve can be fluidly coupled to an accumulator to dampen or absorb oscillations of the boom actuator.

Conventional machines have complex 'T' fittings that split and send the flow to the separate valve, and then to the boom actuators and the accumulator. Such configuration involves many fittings and complex plumbing (e.g., multiple hydraulic lines, hoses, and tubes) between the different components of the hydraulic system. The hydraulic system is therefore expensive and complicated to assemble, and comprises multiple potential leak points. As such, this configuration can reduce reliability of the machine and increases the likelihood of malfunction and machine downtime. Therefore, it may be desirable to have a valve that reduce plumbing complexity to reduce cost of the machine and enhances its reliability.

Disclosed herein are hydraulic systems, valve sections, and valve assemblies that, among other features, provide duplicate workports to provide fluid to a pair of actuators without using complex fittings and plumbing. Further, the hydraulic systems, valve sections, and valve assemblies disclosed herein integrate actuator oscillation control features in the valve assembly to reduce plumbing complexity. This way, complexity of the hydraulic system can be reduced, and thus cost can be reduced while enhancing reliability.

Figure 2:
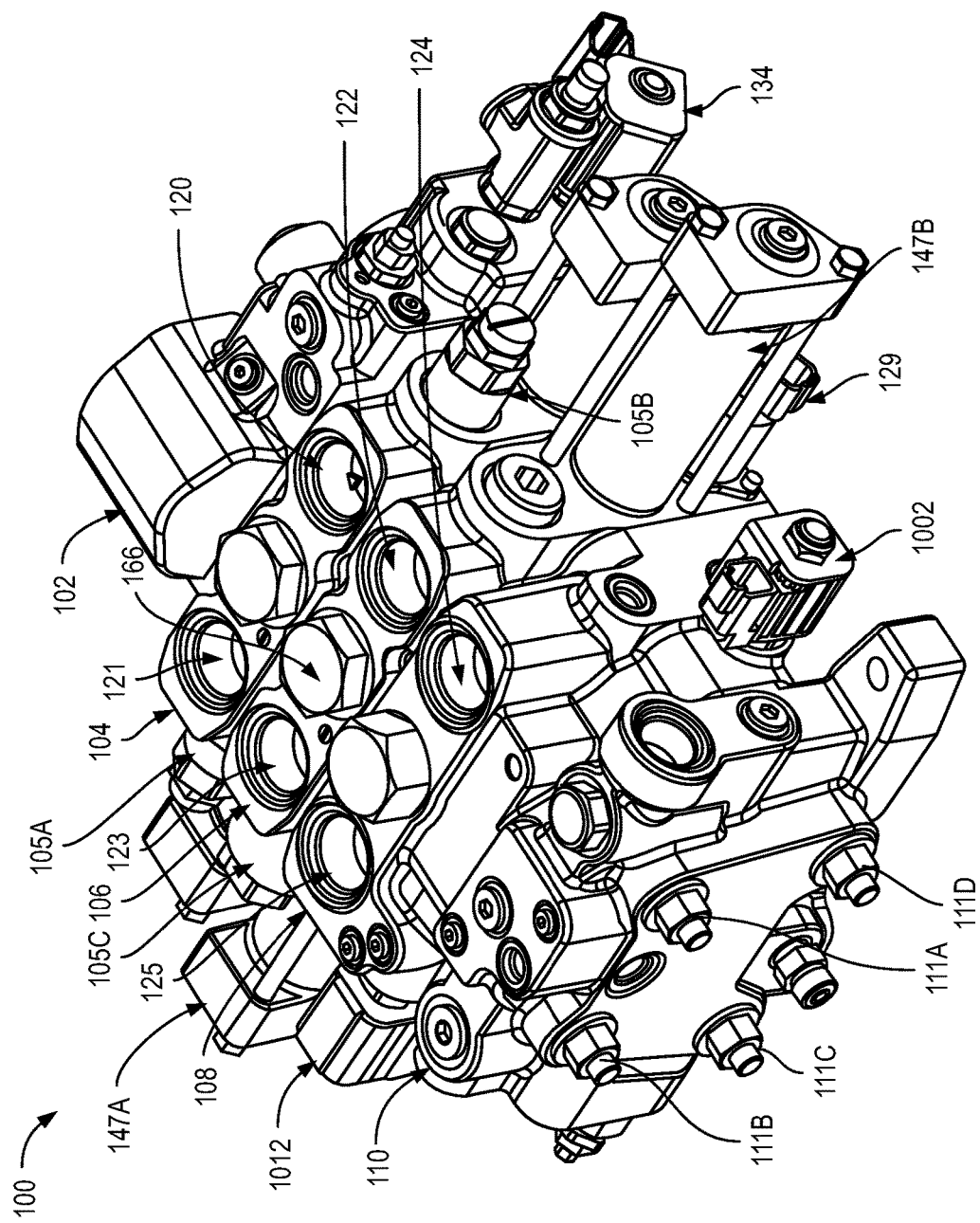
FIG. 2 illustrates a perspective view of the valve assembly shown in FIG. 1 from an opposite point of view, in accordance with an example implementation.

FIG. 1 illustrates a perspective view of a valve assembly 100 of a hydraulic system 200, and FIG. 2 illustrates a perspective view of the valve assembly 100 from an opposite point of view, in accordance with an example implementation. FIGS. 1 and 2 are described together.

The valve assembly 100 can be included in the hydraulic system 200, which can be configured to control implements of a vehicle. A wheel loader is used herein as an example vehicle to illustrate the configuration and operation of the valve assembly 100; however, the features of the valve assembly 100 can be used with other machine or vehicle types.

The hydraulic system 200 of the wheel loader can include a source 202 of fluid. The source can, for example, be a pump that operates as a load-sensing source of pressurized hydraulic fluid, such as a load-sensing variable-displacement pump.

The valve assembly 100 has an inlet section 102, a worksection 104, a worksection 106, a worksection 108, and an outlet section 110. The illustrated valve assembly is provided for illustration purposes, an in other examples, more or fewer worksections can be used.

The inlet section 102, the worksections, 104, 106, 108, and the outlet section 110 can be coupled together by fasteners (e.g., tie rods such as tie rods 111A, 111B, 111C, and 111D shown in FIG. 1) to provide an assembly of the valve sections 102-110. For example, the worksections 104, 106, and 108 can be positioned adjacent one another between the inlet section 102 and the outlet section 110 of the valve assembly 100.

Assuming the hydraulic system 200 is for a wheel loader, the worksection 104 can be configured to control fluid flow to and from a bucket actuator 204, whereas the worksections 106, 108 can be configured to control fluid flow to and from a pair of boom actuators 206, 208. The boom actuators 206, 208 are actuated in tandem (e.g., in the same direction) to lift or lower the bucket of the wheel loader. Further, the worksection 108 integrates oscillation control features within the valve assembly 100 as described below with respect to FIG. 10.

Each of the actuators 204, 206, 208 is depicted in as a linear actuator having a cylinder and a piston slidably accommodated in the cylinder. The piston includes a piston head and a rod extending from the piston head along a central longitudinal axis direction of the cylinder. The rod is coupled to a respective implement (e.g., coupled to the bucket of the wheel loader). The piston head divides the inner space of the cylinder into a first chamber and a second chamber. As an example, the second chamber can be the chamber that has the rod of the piston and can therefore be referred to as the rod side or the rod chamber. The first chamber can be referred to as the cap side or the head side.

As shown in FIG. 1, the worksection 104 has a valve section body 112. Similarly, the worksection 106 has a valve section body 114, and the worksection 108 has a valve section body 115. The valve section bodies 112, 114, and 115 can, for example, be made as metal castings.

The source 202 of fluid of the hydraulic system 200 is configured to receive fluid from a reservoir or tank 210 to provide pressurized fluid to the valve assembly 100. The tank 210 can be configured to store hydraulic fluid at a low pressure, e.g., 0-70 pounds per square inch (psi).

The valve assembly 100, and particularly, the inlet section 102, can include a main pressure relief valve 113 to protect components of the hydraulic system from elevated pressure levels that exceed a particular threshold pressure level (e.g., 5000 psi). If a pressure level of the fluid in the hydraulic system exceeds the threshold pressure level, the main pressure relief valve 113 opens a fluid path from the pump to the tank.

The source 202 of fluid can be fluidly coupled to an inlet port 116 disposed in the inlet section 102 of the valve assembly 100 such that output fluid flow from the source 202 is received at the inlet port 116. The output fluid flow of the pump is then provided to the valve sections of the valve assembly 100.

The tank 210 is fluidly coupled to a tank port 118 also disposed in the inlet section 102 of in the valve assembly 100. Fluid can be allowed to return to the tank 210 from the valve sections of the valve assembly 100 via a tank flow passage and through the tank port 118.

As shown in FIG. 1, the tank port 118 and the inlet port 116 are vertically-stacked in different planes. Particularly, in the example implementation shown in FIG. 1, the tank port 118 is disposed vertically above the inlet port 116 in the inlet section 102 of the valve assembly 100. This configuration can be beneficial if the valve assembly 100 is used, for example, to control an articulated hydraulic machine or vehicle, e.g., an articulated wheel loader. An articulated vehicle is a vehicle that is formed as two separate pieces. The two separate pieces are joined at a central point, and the articulated vehicle swivels at the central point. This configuration enables the articulated vehicle to maneuver in tight spaces. When the articulated vehicle swivels, however, hoses and hydraulic lines that communicate fluid to and from a valve assembly controlling operation of the articulated vehicle may rub against each other and damage may occur. The configuration of the valve assembly 100 shown in FIG. 1 can preclude such damage from occurring. Particularly, the valve assembly 100 can be disposed at a central location of the articulated vehicle. Further, the vertical stacking of the tank port 118 and the inlet port 116 causes a hose or hydraulic line that connects the source 202 to the inlet port 116 to be disposed in a plane that is different from a respective plane of a hose or hydraulic line that connects the tank port 118 to the tank 210. As a result, the hoses do not rub against each other when the articulated vehicle swivels and damage thereto may be precluded.

The worksection 104 includes a first workport 120 and a second workport 121. The workport 120 can, for example, be fluidly coupled to a first chamber (head side) of the bucket actuator 204, whereas the workport 121 can be fluidly coupled to a second chamber (rod side) of the bucket actuator 204.

Similarly, the worksection 106 includes a first workport 122 and a second workport 123. The workport 122 can, for example, be fluidly coupled to a first chamber (head side) of the first boom actuator 206, whereas the workport 123 can be fluidly coupled to a second chamber (rod side) of the first boom actuator 206. The worksection 108 includes a first workport 124 and a second workport 125. The workport 124 can, for example, be fluidly coupled to a first chamber (head side) of the second boom actuator 208, whereas the workport 125 can be fluidly coupled to a second chamber (rod side) of the second boom actuator 208. Hydraulic lines are represented schematically as dashed lines in FIG. 1. Further, hydraulic lines connecting the workports 120-125 to their respective actuators are not shown in FIG. 1 to reduce visual clutter in the drawing.

In conventional systems, a single worksection is used to control fluid to and from the pair of boom actuators where fluid is split and sent to a separate, external valve that performs oscillation control, and then on to the boom actuators and an accumulator. With the configuration of the valve assembly 100, however, the worksection 108 duplicates the workports of the worksection 106 as described in details below. This way, fluid is split internally to be provided through the workports of the worksection 106 to the first boom actuator 206, and provided through workports of the worksection 108 to the second boom actuator 208. Further, the worksection 108 is configured to include the oscillation control components and features.

The valve assembly 100 can include workport relief valves to protect the hydraulic actuators from high pressure levels. For example, the worksection 104 can include a first workport relief valve 105A fluidly coupled to the workport 121 to protect the rod side of the bucket actuator 204 and a second workport relief valve 105B fluidly coupled to the workport 120 to protect the head side of the bucket actuator 204. In examples, the worksection 106 can include an anti-cavitation valve 105C fluidly coupled to the workport 123 and the workport 125 to allow fluid from the tank 210 to flow to the rod sides of the boom actuators 206, 208 if pressure level therein drops below a threshold pressure level (e.g., 50 psi) as pistons of the boom actuators 206, 208 retract at a high speed.

Each of the worksections 104, 106 includes a respective spool as described below with respect to FIG. 3. The spool can be actuated in either direction via various types of mechanisms. As an example for illustration, a pilot valve 126 and a corresponding pilot valve on the other side of the worksection 104 can be solenoid-operated and can be used to actuate or move the spool in a spool bore disposed with the worksection 104. Similarly, a pilot valve 128 (shown in FIG. 3) and a corresponding pilot valve (pilot valve 129 shown in FIGS. 2, 3) on the other side of the worksection 106 can be solenoid-operated and can be used to actuate or move the spool in a spool bore disposed with the worksection 106. However, other configurations of pilot valves that are manually, hydraulically, or pneumatically actuated can be used. The pilot valves 126, 128, 129 are depicted and described herein as solenoid-operated as an example for illustration only.

The pilot valves 126, 128, 129 are configured to receive a pilot fluid signal, such that when a pilot valve of the pilot valves 126, 128, 129 is actuated by an electric signal, the actuated pilot valve provides the pilot fluid signal or enables communication of the pilot fluid signal to an end cap disposed at a respective end of the spool. The fluid in the end cap applies a force on the spool in a respective axial direction causing the spool to shift in the spool bore.

Referring to FIG. 1, to provide the pilot fluid signal to the pilot valves 126, 128, 129, the inlet section 102 of the valve assembly 100 includes a pressure reducing valve 130 that is fluidly coupled to the inlet port 116 via a hydraulic passage within the inlet section 102. The pressure reducing valve 130 is configured to receive the pressurized fluid provided by the source 202 and generate the pilot fluid signal for the pilot valves 126, 128, 129. Particularly, the pressure reducing valve 130 is configured to reduce pressure level of the pressurized fluid provided by the source 202 (which can have a high pressure level such as 4000 psi) to a particular lower pressure level, such as 600 psi. Other techniques can be used to generate the pilot fluid signal. For example, the pilot fluid signal can be provided externally to the valve assembly 100 through a particular port in one of the valve sections (e.g., the inlet section 102). In another example, the pilot fluid signal can be provided from the source 202 or from another source (e.g., another pump) configured to generate the pilot fluid signal. Generating the pilot fluid signal by the pressure reducing valve 130 is used herein as an example for illustration.

The pilot fluid signal generated by the pressure reducing valve 130 can then flow to a pilot-enable valve 134 disposed in the inlet section 102. The pilot-enable valve 134 is actuatable by a solenoid 135. When the pilot-enable valve 134 is actuated (e.g., an electric signal is provided to the solenoid 135), the pilot-enable valve 134 operates in a pilot-enable state.

When the pilot-enable valve 134 is unactuated (e.g., no electric signal is provided to the solenoid 135), the pilot-enable valve 134 operates in a pilot-disable state. When the pilot-enable valve 134 operates in the pilot-disable state, the pilot fluid signal generated by the pressure reducing valve 130 is blocked. Thus, when the pilot-enable valve 134 is unactuated, no pilot fluid signal is provided to the pilot valves 126, 128, 129. In this state, the valve assembly 100 operates in a safety mode and the spools (e.g., the spool 148 of the worksection 106) are not actuatable. As such, the pilot-enable valve 134 facilitates safe operation of the valve assembly 100. Particularly, the pilot-enable valve 134 enables shifting of the spools (e.g., the spool 148) in the worksections 104, 106 when the pilot-enable valve 134 is energized or actuated, but disables shifting of the spools when the pilot-enable valve 134 is de-energized or de-actuated FIG. 3 illustrates a cross-sectional view of the worksection 106, in accordance with an example implementation. Referring to FIGS. 1, 2, 3 together, when the solenoid 135 is energized and the pilot-enable valve 134 operates in the pilot-enable state, the pilot-enable valve 134 enables communication of the pilot fluid signal to the worksections 104, 106. Particularly, the pilot fluid signal generated by the pressure reducing valve 130 flows through the pilot-enable valve 134. The pilot fluid signal then flows through pilot fluid passages formed of cross-drilled passages in the inlet section 102 and the worksections 104, 106 to provide the pilot fluid signal to the pilot valves 126, 128, 129.

For example, the inlet section 102 may include cross-drilled passages that communicate the pilot fluid signal to pilot openings in the inlet section 102, and the pilot openings of the inlet section 102 can be aligned with corresponding pilot openings in the worksections 104, 106, such as pilot openings 141A, 141B of the worksection 106 (shown in FIG. 3), to form a pilot fluid passage and enable the pilot fluid signal to traverse the valve assembly 100. The pilot fluid passage is further connected through cross-drilled passages in the worksections 104, 106 to the pilot valves 126 (and the corresponding pilot valve on the other side of the worksection 104), 127, 128.

Figure 3:
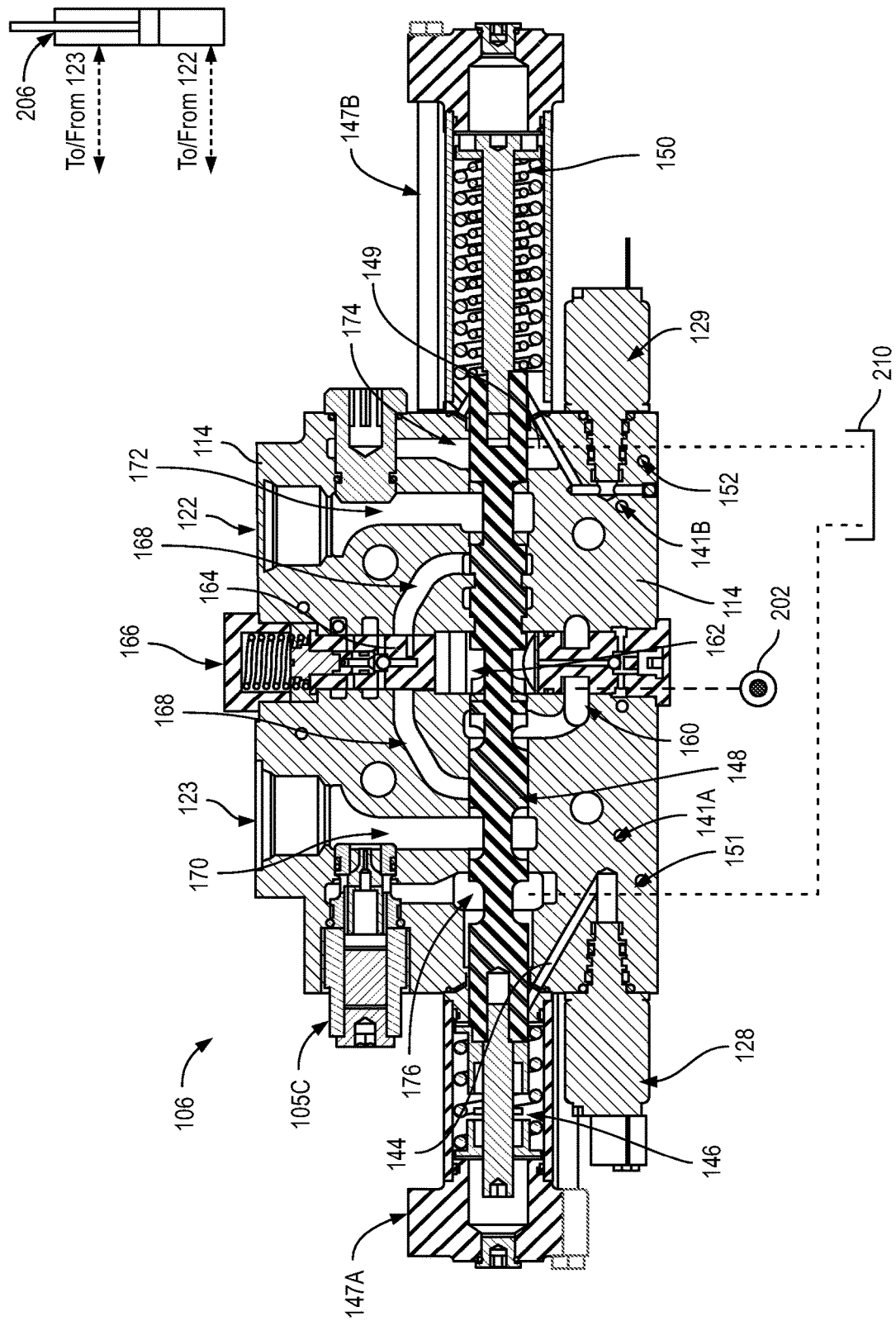
FIG. 3 illustrates a cross-sectional view of a worksection, in accordance with an example implementation.

Referring to FIG. 3, if the pilot valve 128 is actuated, the pilot valve 128 reduces a pressure level of the pilot fluid signal (e.g., from 600 psi to a pressure level value between 200 psi and 460 psi proportional to an electric command signal to the pilot valve 128) and allows the pilot fluid signal to flow through passage 144 to end cap chamber 146 within end cap 147A. The pilot fluid then applies a force on a spool 148 disposed in a spool bore in the valve section body 114 of the worksection 106 to move the spool 148 axially in a first direction (e.g., to the right in FIG. 3).

Conversely, if the pilot valve 129 is actuated, the pilot valve 129 reduces a pressure level of the pilot fluid signal (e.g., from 600 psi to a pressure level value between 200 psi and 460 psi proportional to an electric command signal to the pilot valve 129) and allows the pilot fluid signal to flow through passage 149 to end cap chamber 150 within end cap 147B. The pilot fluid then applies a force on the spool 148 to move the spool 148 axially in a second direction (e.g., to the left in FIG. 3), opposite the first direction.

As illustrated in FIG. 3, the worksection 106 further includes drain openings 151, 152. The drain openings 151, 152 fluidly couple the pilot valves 128, 129, respectively, through cross-drilled passages in the valve assembly 100 (not shown in the cross-sectional view of FIG. 3) to a drain passage. The drain passage can operate as a dedicated drain connection for the pilot valves 128, 129. The drain passage fluidly couples the pilot valves 128, 129 to a drain port that is separate from the tank port 118. As such, the drain passage is separate from tank flow passages, and is thus not exposed to elevated return flow pressure in the tank flow passages and the tank 210. The worksection 104 can be configured with and pilot and drain openings similar to the worksection 106, and operation of the pilot valve 126 and the corresponding pilot valve on the opposite side of the worksection 104 can be configured to be similar to operation of the pilot valves 128, 129.

Movement of the spool 148 of the worksection 106 causes fluid to be directed to and from the workports 122, 123, which are fluidly coupled to the head and rod sides, respectively, of the first boom actuator 206. Particularly, movement of the spool 148 within a respective spool bore defines one or more variable area metering orifices that provide metered flow across the spool 148 depending upon the spool position. For example, the spool 148 has a plurality of annular grooves or axial notches that cooperate with internal surfaces of the valve section body 114 to define metering orifices. A position of the spool may be adjusted with respect to the valve section body 114 to variably adjust the area of the metering orifices.

Fluid from the inlet port 116 is provided to an inlet passage 160 shown in FIG. 3. Assuming that the spool 148 moves to the right due to actuation of the pilot valve 128, a variable area metering orifice can be formed to allow fluid to flow from the inlet passage 160 to a metered flow chamber 162. The worksection 106 includes a pressure compensator valve 166 located downstream from the metered flow chamber 162. The pressure compensator valve 166 is configured to maintain a predetermined pressure drop across a variable metering orifice formed when the spool 148 is moved axially regardless of the load experienced by the boom actuator 206, 208.

The fluid in the metered flow chamber 162 can then push a poppet 164 of the pressure compensator valve 166 and flow to a regulated flow passage 168. Another variable area metering orifice forms as the spool 148 shifts to the right to allow fluid to flow from the regulated flow passage 168 to a workport fluid passage 170, and then to the workport 123, which is fluidly coupled to the rod side of the first boom actuator 206. As a result, a piston of the first boom actuator 206 retracts (e.g., moves downward in FIG. 3). Fluid exiting or forced out of the head side of the first boom actuator 206 as the piston retracts is communicated to the workport 122 and then to a workport fluid passage 172. Another variable area metering orifice forms as the spool 148 shifts to the right to allow fluid to flow from the workport fluid passage 172 to a tank passage 174, which can be fluidly coupled to the tank 210.

Conversely, if the spool 148 moves to the left due to actuation of the pilot valve 129, a variable area metering orifice can be formed to allow fluid to flow from the inlet passage 160 to the metered flow chamber 162. The fluid in the metered flow chamber 162 can then push the poppet 164 of the pressure compensator valve 166 and flow to the regulated flow passage 168. Another variable area metering orifice forms as the spool 148 shifts to the left to allow fluid to flow from the regulated flow passage 168 to the workport fluid passage 172, and then to the workport 122, which is fluidly coupled to the head side of the first boom actuator 206. As a result, the piston of the first boom actuator 206 extends (e.g., moves upward in FIG. 3). Fluid exiting or forced out of the rod side of the first boom actuator 206 as the piston extends is communicated to the workport 123 and then to the workport fluid passage 170. Another variable area metering orifice forms as the spool 148 shifts to the left to allow fluid to flow from the workport fluid passage 172 to a tank passage 176, which can be fluidly coupled to the tank 210.

In conventional systems, fluid provided to the workport 122 or the workport 123 is split via a complex 'T' fitting to be provided to the second boom actuator 208 so as to drive the boom actuators 206, 208 together in tandem. Fluid can further be split via the 'T' fitting and provided to a separate valve configured to control oscillations of the boom actuators 206, 208 as the wheel loader moves.

The valve assembly 100, however, is configured to have the worksection 108 coupled to or integrated with the worksection 106 so as to implement an internal flow split and avoid using complex fittings and plumbing. Specifically, the workport 124 of the worksection 108 is fluidly coupled to the workport 122 of the worksection 106 such that fluid provided to the workport 122 of the worksection 106 is split internally and provided also to the workport 124 of the worksection 108. This way, fluid provided to the workport 122 to be provided to the head side of the first boom actuator 206 is internally split and provided to the workport 124 to be provided to the head side of the second boom actuator 208 without using complex fittings.

Similarly, the workport 125 of the worksection 108 is fluidly coupled to the workport 123 of the worksection 106 such that fluid provided to the workport 123 of the worksection 106 is split internally and provided also to the workport 125 of the worksection 108. This way, fluid provided to the workport 123 to be provided to the rod side of the first boom actuator 206 is internally split and provided to the workport 125 to be provided to the rod side of the second boom actuator 208 without using complex fittings.

Further, the worksection 108 is configured to include oscillation control features and components. This way, the worksection 108 provides fluid to and receive fluid from the second boom actuator 108 as well as include the oscillation control components. With this configuration of the valve assembly 100 may reduce plumbing complexity of the hydraulic system 200 and enhances reliability.

The worksection 108 can be coupled to the worksection 106 in several ways. For example, the worksections 106, 108 can be formed as a monoblock (e.g., a single manifold or casting) having the four workports 122, 123, 124, 125 formed therein and fluidly coupled via internal passages. In other words, the valve section bodies 114, 115 are configured as one casting. This configuration is shown in FIG. 4.

Figure 5:
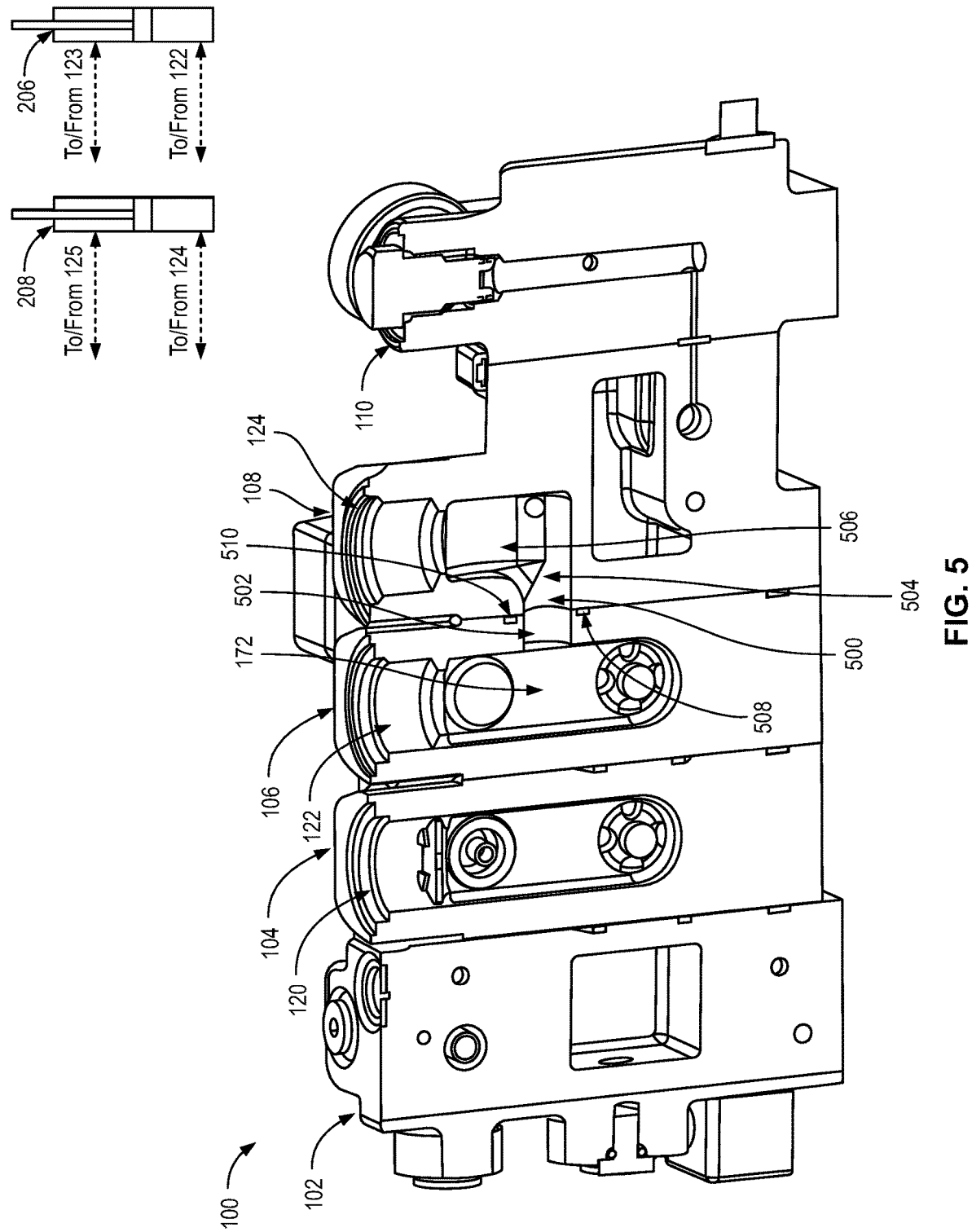
FIG. 5 illustrates a partial perspective cross-sectional view of the valve assembly of FIGS. 1-2 showing two worksections formed as separate castings that interface to form a fluid conduit, which fluidly couples workports of the two worksections, in accordance with an example implementation.

Alternatively, the worksections 106, 108 can be formed as separate castings and are stacked together to align internal passages thereof and fluidly couple the workport 122 to the workport 124 and fluidly couple the workport 123 to the workport 125. This configuration can be implemented using face seals between the worksections 106, 108 as shown in FIG. 5 or using tubes that fluidly coupled respective internal passages in the worksections 106, 108 as illustrated in FIGS. 6, 7, 8, and 9.

Figure 4:
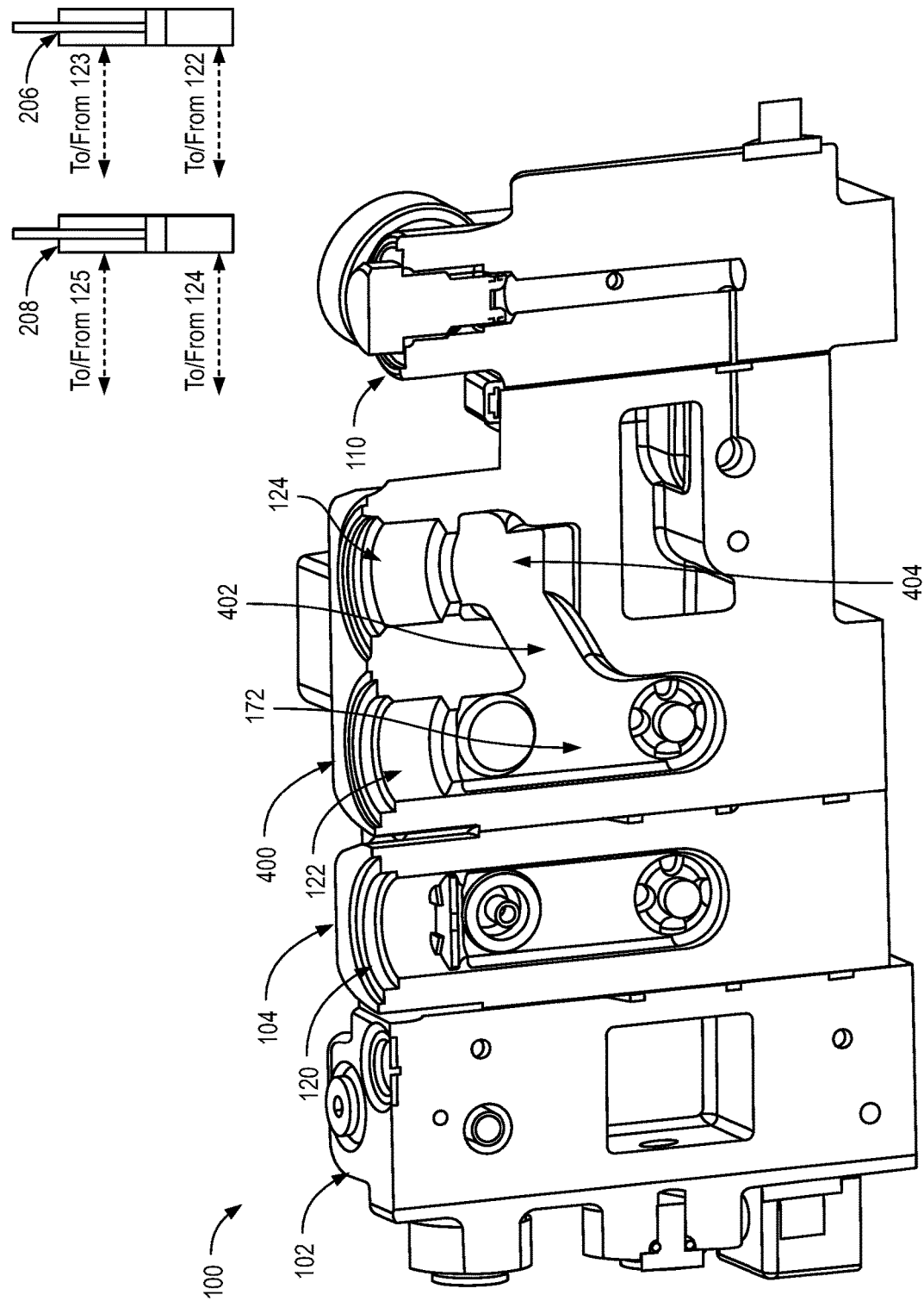
FIG. 4 illustrates a partial perspective cross-sectional view of the valve assembly of FIGS. 1-2 showing two worksections formed as a monoblock worksection, in accordance with an example implementation.

FIG. 4 illustrates a partial perspective cross-sectional view of the valve assembly 100 showing the worksections 106, 108 formed as a monoblock worksection 400, in accordance with an example implementation. As depicted in FIG. 4, the worksections 106, 108 are integrated into the monoblock worksection 400 configured as a single casting rather than two separate castings.

The monoblock worksection 400 includes a fluid passage 402 that fluidly couples the workport fluid passage 172 (which is fluidly coupled to the workport 122) to a workport fluid passage 404, which is fluidly coupled to the workport 124. When the pistons of the boom actuators 206, 208 are to be extended (the spool 148 moves to the left in FIG. 3), pressurized fluid is provided to the workport fluid passage 172 then to the workport 122 to be provided to the head side of the first boom actuator 206. At the same time, the pressurized fluid is split via the fluid passage 402 and provided to the workport fluid passage 404, then to the workport 124, and then to the head side of the second boom actuator 208 so as to extend the boom actuators 206, 208 in tandem.

When the pistons of the boom actuators 206, 208 are to be retracted (the spool 148 moves to the right in FIG. 3), fluid forced out of the head sides of the boom actuators 206, 208 is provided to the workports 122, 124. Fluid provided to the workport 122 is communicated to the workport fluid passage 172, and fluid provided to the workport 124 is also communicated to the workport fluid passage 172 via the workport fluid passage 404 and the fluid passage 402. This way, fluid is combined in the workport fluid passage 172 and provided to the tank passage 174 (see FIG. 3) and then to the tank 210 as described above with respect to FIG. 3. With the configuration of FIG. 4, fluid to be provided to or received from the workports 122, 124 is split or combined without using complex fitting or plumbing.

Although not shown in the cross-sectional view of FIG. 4, the workports 123, 125 are also internally fluidly coupled to each other via fluid passages in the worksection 108 that are similar the fluid passage 402 and the workport fluid passage 404. This way, the workport 125 of the worksection 108 can be fluidly coupled to the workport fluid passage 170 of the worksection 106.

In another example implementation, the worksections 106, 108 can be separate castings that interface with each other or are stacked adjacent to each other to form conduits that couple the workports to each other. FIG. 5 illustrates a partial perspective cross-sectional view of the valve assembly 100 showing the worksections 106, 108 formed as separate castings that interface to form a fluid conduit 500, which fluidly couples the workports 122, 124, in accordance with an example implementation.

As depicted in FIG. 5, the worksections 106, 108 are stacked adjacent to each other such that a fluid passage 502 in the worksection 106 is aligned with a corresponding fluid passage 504 in the worksection 108 to form the fluid conduit 500. The fluid conduit 500 fluidly couples the workport fluid passage 172 (which is fluidly coupled to the workport 122) of the worksection 106 to a workport fluid passage 506 (which is fluidly coupled to the workport 124) of the worksection 108.

When the pistons of the boom actuators 206, 208 are to be extended (the spool 148 moves to the left in FIG. 3), pressurized fluid is provided to the workport fluid passage 172 then to the workport 122 to be provided to the head side of the first boom actuator 206. At the same time, the pressurized fluid is split via the fluid conduit 500 and provided to the workport fluid passage 506, then to the workport 124 and the head side of the second boom actuator 208 so as to extend the boom actuators 206, 208 in tandem.

When the pistons of the boom actuators 206, 208 are to be retracted (the spool 148 moves to the right in FIG. 3), fluid forced out of the head sides of the boom actuators 206, 208 is provided to the workports 122, 124. Fluid provided to the workport 122 is communicated to the workport fluid passage 172, and fluid provided to the workport 124 is also communicated to the workport fluid passage 172 via the workport fluid passage 506 and the fluid conduit 500. This way, fluid is combined in the workport fluid passage 172 and provided to the tank passage 174 (see FIG. 3) and then to the tank 210 as described above with respect to FIG. 3. With the configuration of FIG. 5, fluid to be provided to or received from the workports 122, 124 is split or combined without using complex fitting or plumbing.

The worksection 106 can have an annular groove 508 formed in an end face of the worksection 106 that faces the worksection 108. The annular groove 508 is formed about or around the fluid passage 502 and fluid conduit 500.

The annular groove 508 is configured to receive a face seal 510 therein. When the valve assembly 100 is assembled (e.g., via the tie rods 111A-111D shown in FIGS. 1-2) and the worksection 106, 108 are forced against each other, the face seal 510 is squeezed such that sealing surfaces of the face seal 510 are normal to a longitudinal axis of the face seal 510 and the fluid conduit 500. The face seal 510 is thus configured to prevent leakage in the radial direction between the worksections 106, 108 as fluid flows through the fluid conduit 500. As such, fluid flowing through the fluid conduit 500 does not leak at the interface between the worksections 106, 108 to an external environment of the valve assembly 100. The face seal 510 can include any type of face seal such as O-ring, E-ring, C-ring, gasket, end-face mechanical seal, floating seal, due-cone seal, toric seal, etc.

Although not shown in the cross-sectional view of FIG. 5, the workports 123, 125 are also internally fluidly coupled to each other via fluid passages and a fluid conduit in the worksections 106, 108 that are similar the fluid passages 502, 504 forming a fluid conduit similar to the fluid conduit 500. This way, the workport 125 of the worksection 108 can be fluidly coupled to the workport fluid passage 170 of the worksection 106.

In another example implementation, rather than using the face seal 510, a tube can be placed in the fluid conduit 500 at the interface between the worksection 106 and the worksection 108, and the tube can have radial seals so as to preclude leakage between the worksections 106, 108. This configuration is described next with respect to FIGS. 6-9.

Figure 6:
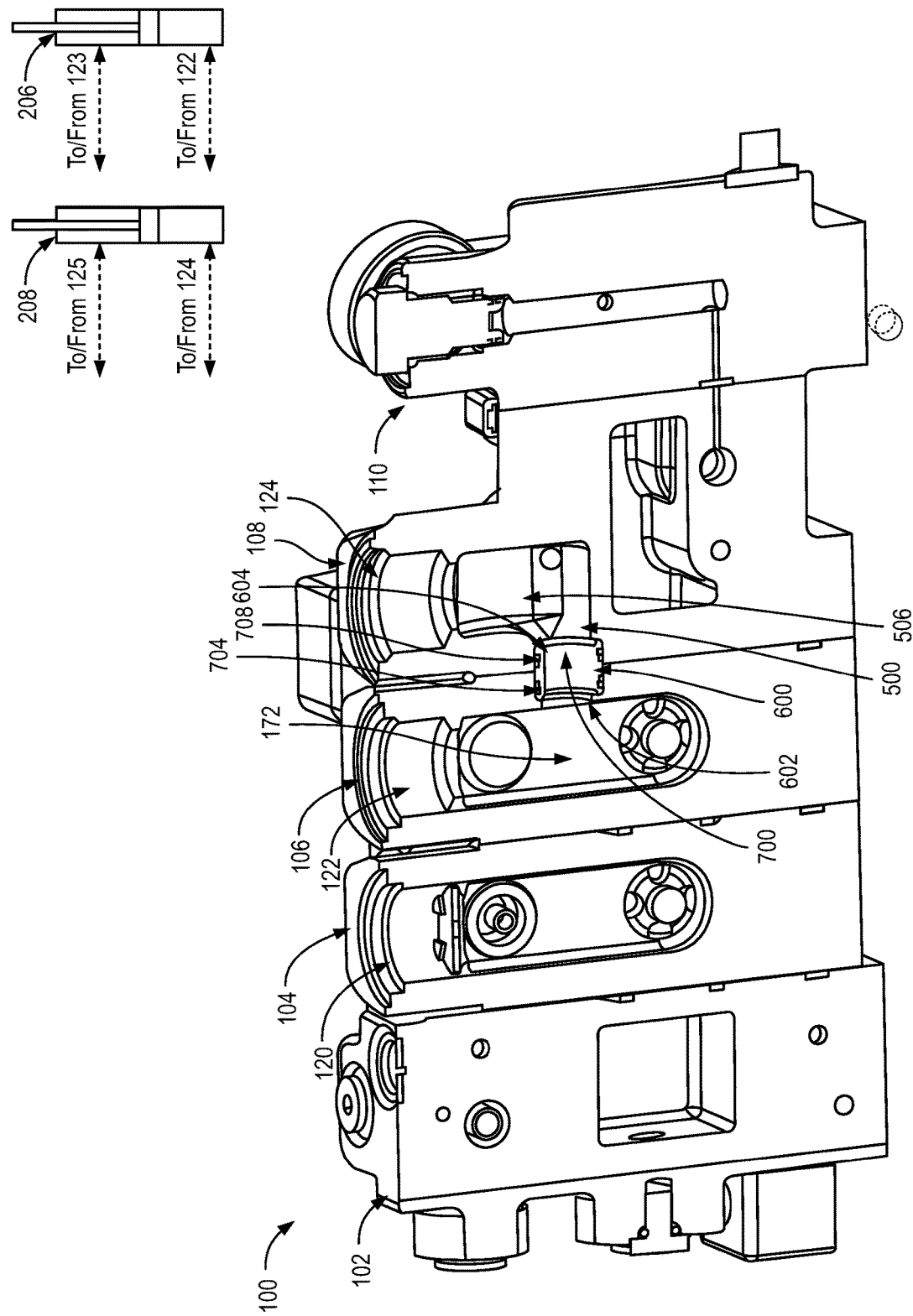
FIG. 6 illustrates a partial perspective cross-sectional view of the valve assembly of FIGS. 1-2 showing two worksections formed as separate castings with a tube disposed within a fluid conduit that fluidly couples workports of the two worksections, in accordance with an example implementation.

FIG. 6 illustrates a partial perspective cross-sectional view of the valve assembly 100 showing the worksections 106, 108 formed as separate castings with a tube 600 disposed within the fluid conduit 500 that fluidly couples the workports 122, 124, in accordance with an example implementation. Similar to the implementation in FIG. 5, in FIG. 6 the worksections 106, 108 are stacked adjacent to each other to form the fluid conduit 500. Additionally, the tube 600 is disposed in the fluid conduit 500, and the tube 600 is hollow such that the hollow interior space of the tube 600 is part of the fluid conduit 500.

The worksection 106 has a counterbore 602 that forms an annular shoulder against which the tube 600 rests, i.e., the tube 600 interfaces with the annular shoulder. Similarly, the worksection 108 has a counterbore 604 that forms an annular shoulder against which the tube 600 rests or with which the tube 600 interfaces. As such, the tube 600 is secured between the annular shoulder of the counterbore 602 and the respective annular shoulder of the counterbore 604.

FIG. 7 illustrates a perspective view of the tube 600, in accordance with an example implementation. As shown in FIG. 7, the tube 600 is cylindrical in shape and is hollow. The interior space of the tube 600 forms a channel 700 that is a portion of or is comprised in the fluid conduit 500 to allow fluid communication between the worksections 106, 108 therethrough.

The tube 600 has a first annular groove 702 formed in an exterior peripheral surface of the tube 600. The first annular groove 702 is configured to receive a first radial seal 704 (e.g., an O-ring) therein. Referring to FIGS. 6 and 7 together, the first radial seal 704 is disposed between the interior peripheral surface of the counterbore 602 and the exterior peripheral surface of the tube 600. Pressurized fluid provided to or from the workport fluid passage 172 through the fluid conduit 500 (or the channel 700) squeezes or applies compression on an outside diameter and an inside diameter of the first radial seal 704. The first radial seal 704 thus seals an annular space between the interior peripheral surface of the counterbore 602 and the exterior peripheral surface of the tube 600. As such, fluid flowing through the fluid conduit 500 does not leak through the annular space between the interior peripheral surface of the counterbore 602 and the exterior peripheral surface of the tube 600 to an external environment of the valve assembly 100.

Similarly, the tube 600 has a second annular groove 706 formed in the exterior peripheral surface of the tube 600. The second annular groove 706 is configured to receive a second radial seal 708 (e.g., an O-ring) therein. Referring to FIGS. 6 and 7 together, the second radial seal 708 is disposed between the interior peripheral surface of the counterbore 604 and the exterior peripheral surface of the tube 600. Pressurized fluid provided to or from the workport fluid passage 506 through the fluid conduit 500 (or the channel 700) squeezes or applies compression on an outside diameter and an inside diameter of the second radial seal 708. The second radial seal 708 thus seals an annular space between the interior peripheral surface of the counterbore 604 and the exterior peripheral surface of the tube 600. As such, fluid flowing through the fluid conduit 500 does not leak through the annular space between the interior peripheral surface of the counterbore 604 and the exterior peripheral surface of the tube 600 to an external environment of the valve assembly 100.

With this configuration, the channel 700 of tube 600 fluidly couples the workport fluid passage 172 (which is fluidly coupled to the workport 122) of the worksection 106 to the workport fluid passage 506 (which is fluidly coupled to the workport 124) of the worksection 108. When the pistons of the boom actuators 206, 208 are to be extended, pressurized fluid is provided to the workport fluid passage 172 then to the workport 122 to be provided to the head side of the first boom actuator 206. At the same time, the pressurized fluid is split via the channel 700 of the tube 600 and provided to the workport fluid passage 506, then to the workport 124 and the head side of the second boom actuator 208 so as to extend the boom actuators 206, 208 in tandem.

When the pistons of the boom actuators 206, 208 are to be retracted, fluid forced out of the head sides of the boom actuators 206, 208 is provided to the workports 122, 124. Fluid provided to the workport 122 is communicated to the workport fluid passage 172, and fluid provided to the workport 124 is also communicated to the workport fluid passage 172 via the workport fluid passage 506 and the channel 700. This way, fluid is combined in the workport fluid passage 172 and provided to the tank passage 174 (see FIG. 3) and then to the tank 210 as described above with respect to FIG. 3. With the configuration of FIG. 6, fluid to be provided to or received from the workports 122, 124 is split or combined without using complex fitting or plumbing.

The workports 123, 125 are also internally fluidly coupled to each other via another tube that is similar to the tube 600 forming a channel therein similar to the channel 700. This way, the workport 125 of the worksection 108 can be fluidly coupled to the workport fluid passage 170 of the worksection 106.

FIG. 8 illustrates a perspective view of the worksection 106 having the tube 600 and a tube 800 mounted thereto, in accordance with an example implementation. The tubes 600, 800 are mounted partially within the worksection 106 in their respective counterbores formed in the worksection 106. The worksection 108 can then be mounted to the worksection 106 and the tubes 600, 800 are inserted in their respective counterbores in the worksection 108 until the worksection 108 interfaces with the worksection 106. The tube 800 is configured similar to the tube 600 and is configured to have a channel 802 therein to fluidly couple the workport fluid passage 170 to a workport fluid passage in the worksection 108 so as to fluidly couple the workport 123 to the workport 125.

FIG. 9 illustrates a perspective cross-sectional view of the valve assembly 100 showing the tubes 600, 800, in accordance with an example implementation. When the worksection 108 is assembled to the worksection 106, the tube 600 at the interface between the worksections 106, 108 is configured to fluidly couple the workport 122 to the workport 124. Similarly, when the worksection 108 is assembled to the worksection 106, the tube 800 at the interface between the worksections 106, 108 is configured to fluidly couple the workport 123 to the workport 125.

With the configurations of FIGS. 4-9, the worksection 108 "duplicates" the workports 122, 123 of the worksection 106. The term "duplicate" is used herein to indicate that the fluid provided to the workport 122 is also provided at the same pressure level to the workport 124, and the fluid provided to the workport 123 is also provided at the same pressure level to the workport 125. This way, the two boom actuators 206, 208 can be driven in tandem. Fluidly coupling the workports 122, 124 and the workports 123, 125 is implemented internally within the valve assembly 100, rather than using complex 'T' fittings that split the fluid externally.

As depicted in FIG. 9, the worksections 108 is thicker than the worksection 106 and, in addition to duplicating the workports 122, 123, it further includes oscillation control components integrated therein. This way, fluid exiting or entering the workports 122, 123, 124, 125 is not split externally to be provided to an external, separate valve that has the oscillation control components. Rather, the oscillation control components are integrated within the worksection 108 to avoid or reduce the use of fittings and hydraulic lines in the hydraulic system 200.

Oscillation control features can be used in mobile hydraulic machinery, such as a wheel loader, to improve ride quality on bumpy roads. For example, as a wheel loader with a heavy load goes over a bump, the weight from its bucket shifts up and down as pistons of the boom actuators 206, 208 oscillate back and forth, which causes the entire machine to oscillate. Without oscillation control, to prevent material from spilling out of the bucket, the wheel loader on a bumpy road would proceed slowly, which may be undesirable as it slows down site operations. Limiting oscillations of the boom actuators can render operating the wheel loader more comfortable to the operator, reduces stress on the wheel loader, saves time as the wheel loader can proceed with a comparably higher speed, and can prevent spillage from the bucket.

In example implementations, an accumulator can be used to dampen changes in the force applied to the boom actuators 206, 208. An accumulator can be considered a pressure storage reservoir in which hydraulic fluid is held under pressure that is applied by an external source. The external source can be a spring or a compressed gas. An example accumulator can include a compressible gas (e.g., nitrogen) therein and an elastic diaphragm or a piston, which separates the hydraulic fluid from a section of compressed gas beneath. While hydraulic fluid is incapable of being substantially compressed under force, gas can be compressed, and can thus absorb or dampen motion.

In examples, for the oscillation control system to operate, the oscillation control system can be configured to provide fluid connection between the accumulator and the head sides of the boom actuators 206, 208, i.e., between the accumulator and the workports 122, 124. The oscillation control system can also be configured to provide a connection between the source 202 of fluid (e.g., the pump) and the accumulator so as to allow charging the accumulator with high pressure fluid to substantially equalize pressure level of fluid at the workports 122, 124 (within head sides of the boom actuators 206, 208) and the pressure level of fluid in the accumulator. It may also be desirable for the oscillation control system to provide a fluid connection between the rod sides of the boom actuators 206, 208 and the tank 210 to lower pressure level in the rod sides of the boom actuators 206, 208 under some operating conditions.

Rather than providing the aforementioned fluid connections between the accumulator, the source 202, the workports 122-125, the tank 210, etc., via a separate valve and complex plumbing, the valve assembly 100 provides oscillation control features integrated therein. Particularly, the worksection 108, which duplicates the workports 122, 123, also includes oscillation control solenoid valves and connections to implement oscillation control features without external plumbing. This configuration may reduce cost and complexity of the plumbing in the hydraulic system 200 and may enhance reliability of the hydraulic system 200.

Figure 10:
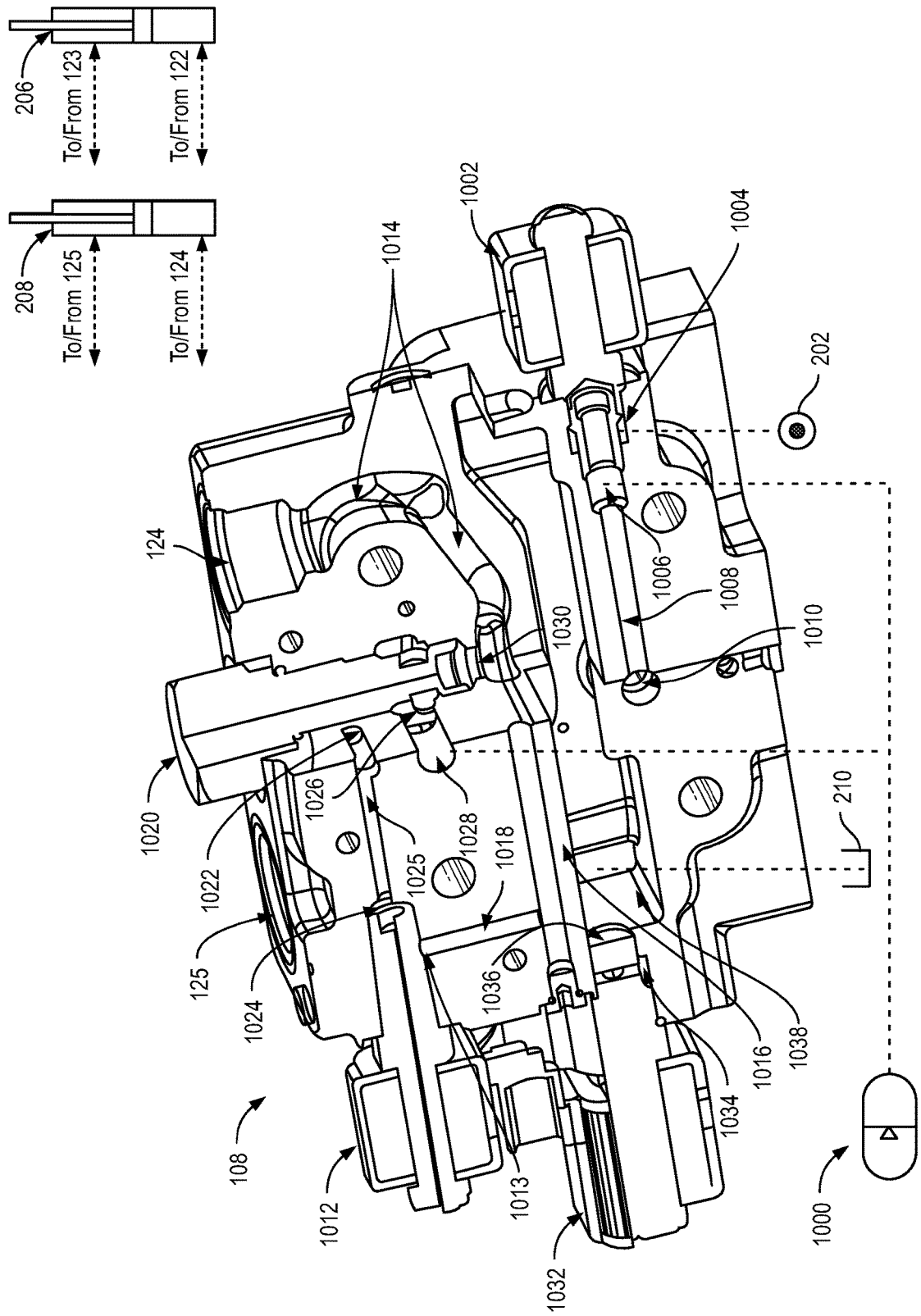
FIG. 10 illustrates a cutaway perspective view of a worksection showing oscillation control features, in accordance with an example implementation.

FIG. 10 illustrates a cutaway perspective view of a worksection showing oscillation control features, in accordance with an example implementation. The cutaway shown in FIG. 10 can be of the monoblock worksection 400 shown in FIG. 4 or the worksection 108 shown in FIGS. 5, 6, 9. In the description below, reference is made to the worksection 108; however, it should be understood that the description and components are equally applicable to the monoblock worksection 400. Hydraulic lines are represented schematically in FIG. 10 as dashed lines for illustration.

The worksection 108 integrates oscillation control features therein. Beneficially, because the workports 124, 125 of the worksection 108 are fluidly coupled to the workports 122, 123, fluid from both of the boom actuators 206, 208 can be provided to and from the oscillation control components that are integrated with the worksection 108 without having to route the fluid to an external valve having the oscillation control components and without the associated complex plumbing.

As depicted in FIG. 10, the hydraulic system 200 can include an accumulator 1000 to control, limit, or dampen oscillations of the pistons of the boom actuators 206, 208. The worksection 108 can include a first solenoid-operated valve 1002 that has a first port 1004 fluidly coupled to the source 202 and a second port 1006 fluidly coupled to the accumulator 1000. When the first solenoid-operated valve 1002 is unactuated, fluid communication from the source 202 (e.g., a pump) to the accumulator 1000 is blocked by the first solenoid-operated valve 1002. When the first solenoid-operated valve 1002 is actuated, it opens a fluid path from the first port 1004 (from the source 202) to the second port 1006, then to the accumulator 1000 to charge the accumulator 1000 with pressurized fluid from the source 202 until pressure level of fluid in the accumulator 1000 reaches a particular desired pressure level.

Further, when the first solenoid-operated valve 1002 is actuated, fluid is provided to a load-sense (LS) passage 1008 to an opening 1010, which is fluidly coupled to an inlet port of a LS shuttle (not shown). The worksections 104, 106 include LS passages that, when a respective spool of a respective worksection is actuated and pressurized fluid is provide to a respective actuator, a LS passage in the worksection becomes fluidly connected to a workport fluidly coupled to the actuator. Thus, the LS passage provides or transmits a pressure feedback signal from the workport, and the pressure feedback signal can indicate the load on the actuator. As such, the pressure feedback signal can be referred to as a LS pressure fluid signal. The LS pressure fluid signal can indicate the fluid pressure required to drive the actuator.

When more than one worksection is actuated, (i.e., both spools of the worksections 104, 106 are actuated), both LS pressure fluid signals from both worksections are provided to respective inlet ports of one or more LS shuttle valves that allows the LS pressure fluid signal with the higher pressure level to pass through to an outlet port of the LS shuttle, while blocking the other LS pressure fluid signal. The LS pressure fluid signal that has the higher pressure level is then provided from the outlet port of a LS shuttle valve to a LS port of a load-sensing source of pressurized fluid, e.g., the source 202. An example load-sensing source of pressurized fluid includes a load-sensing variable displacement pump. The source 202 is configured to provide enough fluid flow at a pressure level that is equal to the pressure level of the LS pressure fluid signal plus a margin pressure value. For example, if a pressure level of the LS pressure fluid signal is 2000 psi, the source 202 can provide fluid flow at a pressure level of 2000 psi plus a margin pressure value (e.g., 200 psi), and thus the fluid can have a pressure of about 2200 psi. In other words, pressure level of pressurized fluid provided by the source 202 is based on the LS pressure signal When none of the actuators 204, 206, or 208 is commanded to move, the spools of the worksections are not actuated, and the LS passages in the worksections 104, 106 are not fluidly coupled to the respective workports. In this case, the source 202 does not receive a load-sense pressure signal. As a result, the source 202 operates in a standby mode of operation where minimal fluid flow is provided at a low pressure level, e.g., at the margin pressure value of 200-300 psi.

To enable the source 202 to provide high pressure fluid to the accumulator 1000, the LS passage 1008 provides a pressure signal from the second port 1006 of the first solenoid-operated valve 1002, when the first solenoid-operated valve 1002 is actuated, to a LS shuttle valve. If none of the worksections 104, 106 is actuated, the LS shuttle valve can pass through the pressure signal from the LS passage 1008 to an LS port of the source 202. The source 202 then provides fluid at a pressure level equal to the pressure level in the LS passage 1008 plus a margin pressure. Thus, fluid at the first port 1004 increases and pressure level in the LS passage 1008, causing the source 202 to provide fluid at an even higher pressure level. As such, the source 202 "chases" itself and provides fluid to the accumulator 1000 at an increasingly higher pressure level. When the pressure level at the accumulator 1000 reaches a desired pressure level, the first solenoid-operated valve 1002 can be deactivated to block fluid flow from the first port 1004 to the second port 1006. As a result, the source 202 can go back to a standby mode as no pressure signal is provided to its LS port via the LS passage 1008.

To dampen oscillations of the boom actuators 206, 208, the worksection 108 is configured to allow fluid communication between the head sides of the boom actuators 206, 208 (i.e., between the workports 122, 124) and the accumulator 1000 under some operating conditions. The worksection 108 includes a second solenoid-operated valve 1012 that has a first port 1013, which is fluidly coupled to the workport 124 via fluid passages 1014, 1016, 1018 formed in the worksection 108.

The worksection 108 further includes a pilot-operated valve 1020. The pilot-operated valve 1020 can be a normally-closed spool-type logic element, for example. The pilot-operated valve 1020 can have three ports: (i) a first port 1022 that is fluidly coupled to a second port 1024 of the second solenoid-operated valve 1012 via fluid passage 1025, (ii) a second port 1026 that is fluidly coupled to the accumulator 1000 via fluid passage 1028, which is fluidly coupled to an accumulator port to which the accumulator 1000 is fluidly coupled, and (iii) a third port 1030 that is fluidly coupled to the workport 124 (which is fluidly coupled to head sides of the boom actuators 206, 208) via the fluid passage 1014.

The pilot-operated valve 1020 has a movable element (e.g., a spool) that, when the pilot-operated valve 1020 is unactuated, blocks fluid flow between the second port 1026 and the third port 1030. The first port 1022 operates a pilot port, and when a pressurized fluid signal (i.e., a pilot signal) is provided to the first port 1022 of the pilot-operated valve 1020, the pilot-operated valve 1020 is actuated and its movable element (e.g., its spool) can move (e.g., upward in FIG. 10) to open a fluid path between the second port 1026 and the third port 1030.

The second solenoid-operated valve 1012 controls actuation or the state of the pilot-operated valve 1020. Particularly, when the second solenoid-operated valve 1012 is unactuated, no pressure fluid signal is provided to the first port 1022 of the pilot-operated valve 1020. Conversely, when the second solenoid-operated valve 1012 is actuated, a pressure fluid signal (i.e., a pilot signal) is provided from the first port 1013 (which is fluidly coupled to the workport 124 via the fluid passages 1014, 1016, 1018) to the second port 1024 and then to the first port 1022 of the pilot-operated valve 1020 via the fluid passage 1025. As a result of the pilot signal provided to the first port 1022, the pilot-operated valve 1020 is actuated, and a fluid path is opened to allow fluid flow between the accumulator 1000 and the workport 124.

The fluid path comprises the fluid passage 1028, the second port 1026 of the pilot-operated valve 1020, the third port 1030 of the pilot-operated valve 1020, and the fluid passage 1014. The fluid path allows fluid flow from the accumulator 1000 to the workport 124 or from the workport 124 to the accumulator 1000. Because the workport 124 is fluidly coupled to the head sides of the boom actuators 206, 208, actuating the second solenoid-operated valve 1012 allows for fluid communication between the head sides of the boom actuators 206, 208 and the accumulator 1000.

Further under some operating conditions, it may be desirable to vent fluid in the rod sides of the boom actuators 206, 208 to the tank 210. The worksection 108 can include a third solenoid-operated valve 1032 having a first port 1034 and a second port 1036. The first port 1034 is fluidly coupled to the workport 125 (which is fluidly coupled to the rod sides of the boom actuators 206, 208). In an example, the first port 1034 is fluidly coupled to the workport 125 via cross-drilled fluid passages (not shown) formed in the worksection 108. The second port 1036 is fluidly coupled to a tank passage 1038, which is fluidly coupled to the tank 210.

When the third solenoid-operated valve 1032 is unactuated, it blocks fluid flow between the first port 1034 and the second port 1036, and thus blocks fluid flow between the workport 125 and the tank 210. When the third solenoid-operated valve 1032 is actuated, it opens a fluid path from the second port 1036 to the first port 1034, and therefore provides a fluid path from the workport 125 to the tank 210 via the second port 1036, the first port 1034, and the tank passage 1038.

With this configuration, the worksection 108 integrates components that can enable controlling (e.g., limiting or dampening) oscillations of the boom actuators 206, 208. The components can be fluidly coupled to the boom actuators 206, 208, the source 202, and the tank 210 to selectively allow fluid communication therebetween without requiring complex fittings and external plumbing. An electronic controller (e.g., microprocessor) of the hydraulic system can then provide electric command signals to various components (e.g., the solenoid-operated valve 1002, the pilot-operated valve 1020, and the solenoid-operated valve 1032) in a particular sequence and at particular times during operation of the hydraulic machine to dampen oscillations of the boom actuators 206, 208.

FIG. 11 is a flowchart of a method 1100 for operating a hydraulic system, in accordance with an example implementation. The method 1100 shown in FIG. 11 presents an example of a method that could be used with the valve assembly 100 and the hydraulic system 200 shown throughout the Figures, for example. The method 1100 may include one or more operations, functions, or actions as illustrated by one or more of blocks 1102-1104. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 1102, the method 1100 includes shifting a spool (e.g., the spool 148) axially in a first axial direction within a bore of the valve assembly 100 (e.g., by actuating the pilot valve 129), wherein the valve assembly 100 comprises: (i) a first workport (e.g., the workport 122) fluidly coupled to a first chamber (e.g., head side) of a first actuator (e.g., the first boom actuator 206), (ii) a second workport (e.g., the workport 123) fluidly coupled to a second chamber (e.g., rod side) of the first actuator (e.g., the first boom actuator 206), (iii) a third workport (e.g., the workport 124) fluidly coupled to a third chamber (e.g., head side) of a second actuator (e.g., the second boom actuator 208), wherein the third workport is fluidly coupled to the first workport via a first fluid passage (e.g., the fluid passage 402, or the fluid conduit 500), (iv) a fourth workport (e.g., the workport 125) fluidly coupled to a fourth chamber (e.g., rod side) of the second actuator (e.g., the second boom actuator 208), wherein the fourth workport is fluidly coupled to the second workport via a second fluid passage, and wherein shifting the spool in the first axial direction causes pressurized fluid to be provided from the source 202 of pressurized fluid to the first workport and to the third workport via the first fluid passage so as to drive the first actuator and the second actuator in tandem in a first direction (e.g., extend the pistons of the boom actuators 206, 208).

At block 1104, the method 1100 includes shifting the spool in a second axial direction opposite the first axial direction (e.g., by actuating the pilot valve 128), thereby causing pressurized fluid to be provided from the source 202 of pressurized fluid to the second workport and to the fourth workport via the second fluid passage so as to drive the first actuator and the second actuator in tandem in a second direction (e.g., retract the pistons of the boom actuators 206, 208) opposite the first direction.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A valve assembly comprising:
   a first worksection configured to control fluid flow to and from a first actuator and a second actuator configured to be actuated in tandem, wherein the first worksection comprises: (i) a first workport configured to be fluidly coupled to a first chamber of the first actuator, (ii) a second workport configured to be fluidly coupled to a second chamber of the first actuator;
   a second worksection mounted to the first worksection, wherein the second worksection comprises: (i) a third workport configured to be fluidly coupled to a third chamber of the second actuator, wherein the third workport is fluidly coupled to the first workport via a first fluid conduit, and (ii) a fourth workport configured to be fluidly coupled to a fourth chamber of the second actuator, wherein the fourth workport is fluidly coupled to the second workport via a second fluid conduit; and
   a spool axially movable in a bore within the first worksection, wherein: (i) when the spool is shifted axially in a first axial direction within the bore, pressurized fluid is provided from a source of pressurized fluid to the first workport and to the third workport via the first fluid conduit so as to drive the first actuator and the second actuator in tandem in a first direction, and (ii) when the spool is shifted axially in a second axial direction within the bore opposite the first axial direction, pressurized fluid is provided from the source of pressurized fluid to the second workport and to the fourth workport via the second fluid conduit so as to drive the first actuator and the second actuator in tandem in a second direction opposite the first direction.

2. The valve assembly of claim 1, wherein the first fluid conduit comprises a first fluid passage formed in the first worksection and a second fluid passage in the second worksection, wherein the first fluid passage is aligned with the second fluid passage to form the first fluid conduit.

3. The valve assembly of claim 1, wherein the first worksection comprises an annular groove formed on an end face of the first worksection that faces the second worksection, wherein the annular groove is formed around the first fluid conduit, wherein the valve assembly further comprises:
   a face seal disposed in the annular groove of the first worksection.

4. The valve assembly of claim 1, further comprising:
   a first tube disposed in the first fluid conduit at an interface between the first worksection and the second worksection; and
   a second tube disposed in the second fluid conduit at the interface between the first worksection and the second worksection.

5. The valve assembly of claim 4, wherein each of the first tube and the second tube comprises:
   a first annular groove formed in an exterior peripheral surface of a respective tube;
   a first radial seal disposed in the first annular groove, wherein the first radial seal is disposed between an interior peripheral surface of the first worksection and the exterior peripheral surface of the respective tube;
   a second annular groove formed in the exterior peripheral surface of the respective tube; and
   a second radial seal disposed in the second annular groove, wherein the second radial seal is disposed between an interior peripheral surface of the second worksection and the exterior peripheral surface of the respective tube.

6. The valve assembly of claim 1, wherein the second worksection further comprises:
   a solenoid-operated valve having a first port and a second port, wherein the first port is configured to be fluidly coupled to the source of pressurized fluid, wherein the second port is configured to be fluidly coupled to an accumulator, wherein when the solenoid-operated valve is actuated, a fluid path is formed therein to allow fluid flow between the first port and the second port so as to allow the accumulator to be charged with pressurized fluid from the source of pressurized fluid.

7. The valve assembly of claim 1, wherein the second worksection further comprises:
a solenoid-operated valve having a first port and a second port, wherein the first port of the solenoid-operated valve is configured to be fluidly coupled to the second workport of the first worksection and the fourth workport of the second worksection, wherein the second port of the solenoid-operated valve is configured to be fluidly coupled to a tank, wherein when the solenoid-operated valve is actuated, a fluid path is formed therein to allow fluid flow between the first port and the second port so as to allow fluid from the second chamber of the first actuator and fluid from the fourth chamber of the second actuator to flow to the tank.

8. The valve assembly of claim 1, wherein the second worksection further comprises:
a solenoid-operated valve having a first port and a second port, wherein the first port of the solenoid-operated valve is fluidly coupled to the first workport of the first worksection and the third workport of the second worksection via a fluid passage within the second worksection; and
a pilot-operated valve having a first respective port, a second respective port, and a third port, wherein first respective port of the pilot-operated valve is fluidly coupled to the second port of the solenoid-operated valve, wherein the second respective port of the pilot-operated valve is configured to be fluidly coupled to an accumulator, and wherein the third port of the pilot-operated valve is fluidly coupled to the first workport of the first worksection and the third workport of the second worksection,
wherein when the solenoid-operated valve is actuated, a fluid path is formed therein to allow fluid to flow from the first port to the second port and then to the first respective port of the pilot-operated valve, thereby actuating the pilot-operated valve and allowing fluid flow between the second respective port and the third port so as to fluidly couple the accumulator to the first workport of the first worksection and the third workport of the second worksection.

9. A hydraulic system comprising:
a source of pressurized fluid;
a tank;
a first actuator having a first chamber and a second chamber;
a second actuator having a third chamber and a fourth chamber, and configured to be actuated in tandem with the first actuator; and
a valve assembly fluidly coupled to the source of pressurized fluid, the tank, the first actuator, and the second actuator, wherein the valve assembly comprises:
a first worksection configured to control fluid flow to and from the first actuator and the second actuator, wherein the first worksection comprises a first workport fluidly coupled to the first chamber of the first actuator, and a second workport fluidly coupled to the second chamber of the first actuator,
a second worksection mounted to the first worksection and comprising: (i) a third workport fluidly coupled to the third chamber of the second actuator, wherein the third workport is fluidly coupled to the first workport via a first fluid passage, and (ii) a fourth workport fluidly coupled to the fourth chamber of the second actuator, wherein the fourth workport is fluidly coupled to the second workport via a second fluid passage, and
a spool axially movable in a bore formed within the first worksection, wherein: (i) when the spool is shifted axially in a first axial direction within the bore, pressurized fluid is provided from the source of pressurized fluid to the first workport and to the third workport via the first fluid passage so as to drive the first actuator and the second actuator in tandem in a first direction, and (ii) when the spool is shifted axially in a second axial direction within the bore opposite the first axial direction, pressurized fluid is provided from the source of pressurized fluid to the second workport and to the fourth workport via the second fluid passage so as to drive the first actuator and the second actuator in tandem in a second direction opposite the first direction.

10. The hydraulic system of claim 9, wherein the first worksection comprises an annular groove formed on an end face of the first worksection that faces the second worksection, wherein the annular groove is formed around the first fluid passage, wherein the valve assembly further comprises:
a face seal disposed in the annular groove of the first worksection.

11. The hydraulic system of claim 9, wherein the valve assembly further comprises:
a first tube disposed in the first fluid passage at an interface between the first worksection and the second worksection; and
a second tube disposed in the second fluid passage at the interface between the first worksection and the second worksection.

12. The hydraulic system of claim 11, wherein each of the first tube and the second tube comprises:
a first annular groove formed in an exterior peripheral surface of a respective tube;
a first radial seal disposed in the first annular groove, wherein the first radial seal is disposed between an interior peripheral surface of the first worksection and the exterior peripheral surface of the respective tube;
a second annular groove formed in the exterior peripheral surface of the respective tube; and
a second radial seal disposed in the second annular groove, wherein the second radial seal is disposed between an interior peripheral surface of the second worksection and the exterior peripheral surface of the respective tube.

13. The hydraulic system of claim 9, further comprising:
an accumulator,
wherein the valve assembly further comprises a solenoid-operated valve having a first port and a second port, wherein the first port is fluidly coupled to the source of pressurized fluid, wherein the second port is fluidly coupled to the accumulator, wherein when the solenoid-operated valve is actuated, a fluid path is formed therein to allow fluid flow between the first port and the second port so as to allow the accumulator to be charged with pressurized fluid from the source of pressurized fluid.

14. The hydraulic system of claim 9, wherein the valve assembly further comprises:
a solenoid-operated valve having a first port and a second port, wherein the first port of the solenoid-operated valve is fluidly coupled to the second workport and the fourth workport, wherein the second port of the solenoid-operated valve is fluidly coupled to the tank, wherein when the solenoid-operated valve is actuated, a fluid path is formed therein to allow fluid flow between the first port and the second port so as to allow fluid from the second chamber of the first actuator and fluid from the fourth chamber of the second actuator to flow to the tank.

15. The hydraulic system of claim 9, further comprising:

an accumulator, wherein the valve assembly further comprises:
- a solenoid-operated valve having a first port and a second port, wherein the first port of the solenoid-operated valve is fluidly coupled to the first workport and the third workport via a fluid passage within the valve assembly, and
- a pilot-operated valve having a first respective port, a second respective port, and a third port, wherein first respective port of the pilot-operated valve is fluidly coupled to the second port of the solenoid-operated valve, wherein the second respective port of the pilot-operated valve is fluidly coupled to the accumulator, and wherein the third port of the pilot-operated valve is fluidly coupled to the first workport and the third workport,
- wherein when the solenoid-operated valve is actuated, a fluid path is formed therein to allow fluid to flow from the first port to the second port and then to the first respective port of the pilot-operated valve, thereby actuating the pilot-operated valve and allowing fluid flow between the second respective port and the third port so as to fluidly couple the accumulator to the first workport and the third workport.

* * * * *